(12) United States Patent
Hviid et al.

(10) Patent No.: US 9,755,704 B2
(45) Date of Patent: Sep. 5, 2017

(54) MULTIMODAL COMMUNICATION SYSTEM INDUCTION AND RADIO AND METHOD

(71) Applicant: BRAGI GmbH, München (DE)

(72) Inventors: Nikolaj Hviid, München (DE); Eric Christian Hirsch, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/244,782

(22) Filed: Aug. 23, 2016

(65) Prior Publication Data

US 2017/0063434 A1    Mar. 2, 2017

Related U.S. Application Data

(60) Provisional application No. 62/211,716, filed on Aug. 29, 2015.

(51) Int. Cl.
| | |
|---|---|
| *H04M 1/00* | (2006.01) |
| *H04B 5/00* | (2006.01) |
| *H04W 4/00* | (2009.01) |
| *H04R 1/10* | (2006.01) |
| *H04R 25/00* | (2006.01) |

(52) U.S. Cl.
CPC ......... *H04B 5/0075* (2013.01); *H04R 1/1016* (2013.01); *H04R 25/552* (2013.01); *H04W 4/008* (2013.01); *H04R 2201/107* (2013.01); *H04R 2420/07* (2013.01)

(58) Field of Classification Search
CPC .............................. H04B 5/0075; H04W 4/008
USPC ................................. 455/41.1, 569.1, 575.2
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — April G Gonzales
(74) *Attorney, Agent, or Firm* — Goodhue, Coleman & Owens, P.C.

(57) ABSTRACT

A system of wearable or personal area devices includes a first earpiece and a second ear piece each of the first ear piece and the second ear piece comprising an ear piece housing, an induction circuit disposed within the ear piece housing for short range communications, and a radio transceiver disposed within the ear piece housing for radio communications. The induction circuit of the first ear piece and the induction circuit of the second ear piece are adapted for communication there between using high bandwidth audio.

18 Claims, 3 Drawing Sheets

(56) References Cited

U.S. PATENT DOCUMENTS

| | | |
|---|---|---|
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1* | 4/2006 | Lair ............... H04M 1/6066 455/41.1 |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2014/0153768 A1* | 6/2014 | Hagen ............. H04R 1/1008 381/380 |
| 2014/0219467 A1* | 8/2014 | Kurtz .............. H04R 3/12 381/74 |
| 2014/0335908 A1* | 11/2014 | Krisch ............. H04W 4/08 455/518 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).

(56) References Cited

OTHER PUBLICATIONS

BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

\* cited by examiner

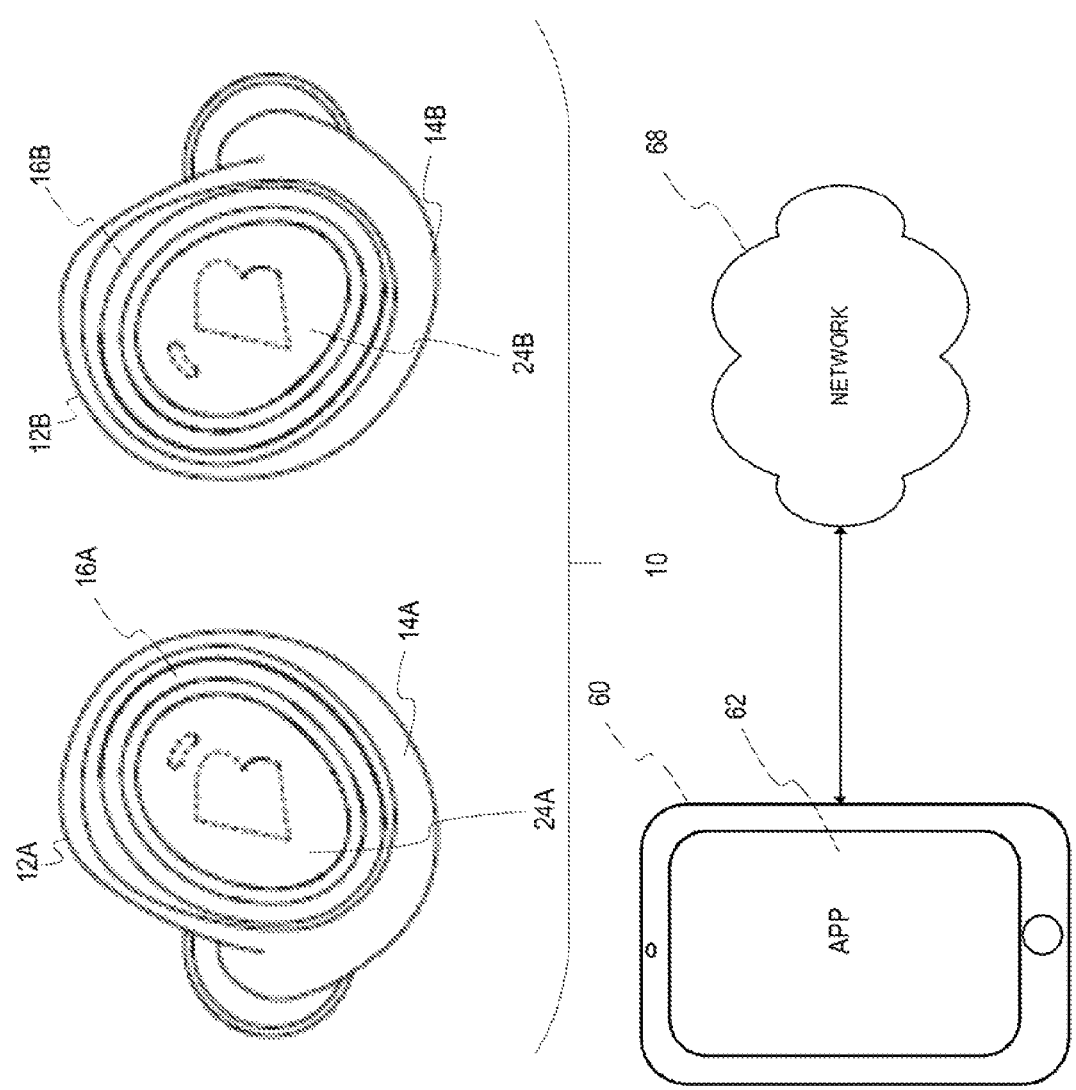

MULTIMODAL COMMUNICATION SYSTEM INDUCTION AND RADIO AND METHOD

RELATED APPLICATIONS

This application claims priority to U.S. Provisional Patent Application No. 62/211,716, filed Aug. 29, 2015, hereby incorporated by reference in its entirety.

FIELD OF THE INVENTION

The present invention relates to wearable devices. More particularly, but not exclusively, the present invention relates to a multimodal communication system using induction and radio communications.

BACKGROUND

One of the problems with wearable devices relates to communications. For purposes here, examples of problems with ear piece systems are described although the present invention is not necessarily limited to this particular context. For example, where there are two earpieces a Bluetooth transmission failure may be detected between the two earpieces precluding an inter-ear system from working. Even with recalibration and RF tuning, a persistent and unacceptable drop in output from the paired earpiece may occur. Such performance is untenable, as devices should work in a number of different use environments and user situations. Using the 2.4 GHz band, this wavelength may be absorbed to a great degree by the surrounding soft tissues of the head, brain and neck. Further, transmission power may be limited by space as well as the requirement of device placement at the external auditory canal. Power requirements using high frequency communications such as those found in the ISM band or Bluetooth standard to adequately transmit to a counterpart wireless earpiece may be physiologically unacceptable. FM transmissions may also have issues with interference, privacy concerns and geographical variances. Additionally, Bluetooth standard transmissions may not be able to accommodate to the anatomic demands of transmission through or around the soft tissues of the cranium. Still further, such a system may be unstable in high humidity environments such as on a beach, walking through snow, on a forest floor or while submerged in water. What is needed is an improved wearable device which may communicate with other wearable devices.

SUMMARY

Therefore, it is a primary object, feature, or advantage to improve over the state of the art.

It is a further object, feature, or advantage to provide an improved earpiece and/or set of ear pieces.

It is a still further object, feature, or advantage to provide the ability to transfer high quality audio and data streams between the two earpieces.

Another object, feature, or advantage is to minimize deterioration of signal between two earpieces.

Yet another object, feature, or advantage is to provide high quality transmission of inter device signals such as inter ear signals.

A further object, feature, or advantage is provide devices such as earpieces which are stable when in proximity to water and high humidity states, forest floors, beaches, skiing, running or walking through the snow, to name but a few examples of environmental conditions.

One or more of these and/or other objects, features, or advantages will become apparent from the specification and claims that follow. No single embodiment need exhibit each and every object, feature, or advantage. It is contemplated that different embodiments will have different objects, features, or advantages.

According to one aspect a system of wearable devices is provided. The system includes a first earpiece and a second ear piece. Each of the earpieces includes an ear piece housing, an induction circuit disposed within the ear piece housing for short range communications, and a radio transceiver disposed within the ear piece housing for radio communications. The induction circuit of the first ear piece and the induction circuit of the second ear piece are adapted for communication there between. The induction circuit may be a near field magnetic induction circuit or other type of induction circuit. The radio transceiver may be a Bluetooth radio transceiver, a frequency modulation (FM) radio transceiver or other type of radio transceiver. The system may further include a mobile device in operative communication with the first earpiece via the radio transceiver disposed within the ear piece housing of the first earpiece. The mobile device may also be in operative communication with the second earpiece via the radio transceiver disposed within the ear piece housing of the second earpiece. The system also may further encompass other devices constituting a personal area network. Such devices are not limited to wearable, ingestible and implantable devices.

According to another aspect, an earpiece includes an earpiece housing, an induction circuit disposed within the ear piece housing for short range communication, and a radio transceiver disposed within the ear piece housing for radio communications. The earpiece may be a left earpiece or a right earpiece. The induction circuit may be a near field induction circuit, a magnetic induction circuit, or other type of induction circuit. The earpiece may further include a battery disposed within the earpiece, the battery operatively connected to the induction circuit and the radio transceiver. There may be an intelligent control disposed within the earpiece housing, the intelligent control operatively connected to the induction circuit and the radio transceiver. There may be at least one microphone associated with the earpiece housing. There may be at least one speaker associated with the earpiece housing.

According to another aspect, an earpiece includes an earpiece housing, an induction circuit disposed within the ear piece housing for short range communication, a radio transceiver disposed within the ear piece housing for radio communications, an intelligent control disposed within the earpiece housing, a microphone associated with the earpiece housing, a speaker associated with the earpiece housing, and a battery disposed within the earpiece housing and operatively connected to the induction circuit, the radio transceiver and the intelligent control. The induction circuit may be a near field magnetic induction circuit or other type of induction circuit. The radio transceiver may be a Bluetooth transceiver or other type of radio transceiver.

According to another aspect, a method for communication between wearable and personal area devices is provided. The method includes providing a first wearable device comprising a wearable device housing, an induction circuit disposed within the wearable device housing for short range communication, and a radio transceiver disposed within the wearable device housing for radio communications. The method further includes providing a second wearable device comprising a wearable or personal area device housing, an induction circuit disposed within the wearable device housing for short range communication, and a radio transceiver disposed within the wearable device housing for radio communications. The method further includes communicating information between the first wearable device and the second wearable device using the induction circuit of the first wearable device and the induction circuit of the second wearable device. The communicating information may include communicating the information through a human body. The first wearable device may be a first earpiece and the second wearable device may be a second earpiece. The step of communicating the information through the human body may include communicating the information through a head. The information may include an audio stream or other data. The method may further include communicating data between the first wearable device and a computing device or mobile device using the radio transceiver of the first wearable or personal area device. Similarly, the method may further include communicating data between the second wearable or personal area device and a computing device or mobile device using the radio transceiver of the second wearable or personal area device. Information communicated with the induction circuitry may include high bandwidth audio including audio greater than that associated with the vocal range, audio more than 7 kHz, 8 kHz, 9 kHz, 10 kHz, 11 kHz, 12 kHz, 13 kHz, 14 kHz, 15 kHz, 16 kHz, 17 kHz, 18 kHz, with less than 3 dB loss.

BRIEF DESCRIPTION OF THE DRAWINGS

FIG. 3 illustrates an example of a system of wearable devices in operative communication with a computing device in the form of a mobile device.

DETAILED DESCRIPTION

Figure 1:
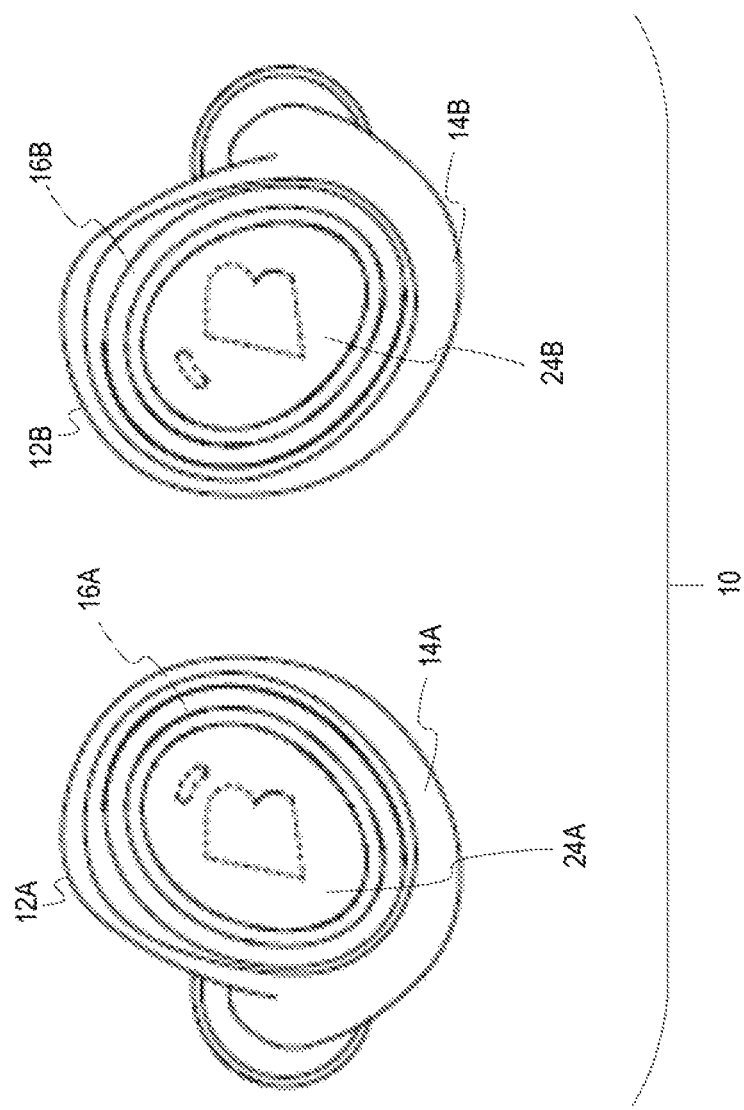
FIG. 1 illustrates one example of a system of wearable devices in the form of a set of ear pieces.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing which is preferably water resistant or water tight to allow the ear pieces to function across a number of different environmental conditions including when submerged in water or in high humidity. A light display area 16A, 16B is present on each of the ear pieces 12A, 12B. The light generation areas 16A, 16B each provide for producing light of one or more colors.

The wearable device may provide for a plurality of different modes of operation. One mode of operation of the device relates to gestural movements. For example, where a user performs a gestural movement which is interpreted by the device the device may light or activate one or more lighting elements to confirm the gestural movement or to indicate that the gestural movement could not be interpreted. In addition, audio feedback may be used to confirm a gestural movement or to indicate that the gestural movement could not be interpreted. As shown, one or more detectors or receivers 24A, 24B may also be present to detect changes in energy fields associated with gestures performed by a user. The receivers 24A, 24B in combination with one or more emitters provide a gesture based user interface.

Figure 2:
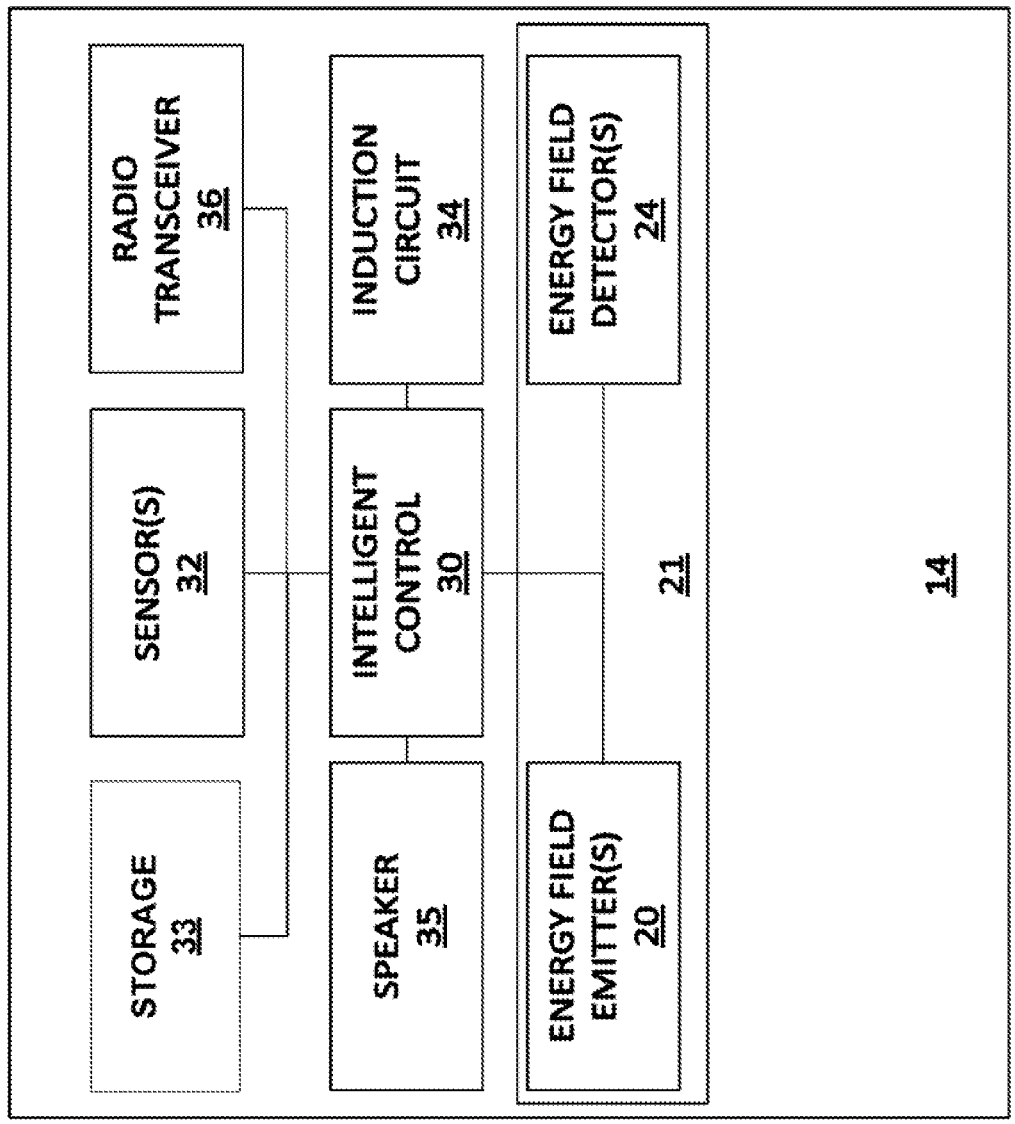
FIG. 2 is a block diagram illustrating one example of a wearable device.

Also as shown in FIG. 2, an intelligent control 30 which may include one or more processors or other circuits is shown. The intelligent control 30 is operatively connected to one or more sensor(s) 32 which may include one or more microphones, one or more inertial sensors (such as accelerometers, gyro sensors, compass, or magnetometers), one or more physiological parameter sensors (such as a pulse oximeter or temperature sensor), a temperature sensor, or combinations thereof. Preferably at least one of the microphones has a frequency response suitable for ambient or environment sounds including the ability to pick up sounds well above the 7 kHz or so associated with the vocal range. Thus the device may be configured to allow unimpeded or unmodified environmental sounds to be captured and reproduced for the user by capturing the sounds at one side of a barrier formed by the ear piece housing and reproducing the sounds at a speaker 35 at the other side of the barrier. The intelligent control 30 is also operatively connected to the speaker 35. The intelligent control may include a data processor and a signal processor. The intelligent control 30 is also operatively connected to both an induction circuit 34 and a radio transceiver 36 and storage 33. The storage may be used to store one or more audio files and may be a solid state memory or other memory. Thus an audio stream associated with an audio file may be communicated through the induction circuit 34 to another device. A battery (not shown) which is also housed within the wearable device housing may be used in a conventional manner to power the various components of the wearable device.

The wearable devices may communicate with each other to share information. This information may include information related to user input such as gestures performed at one of the devices. This information may also include other information such as audio streams received at one of the devices. Of course, other information may also be communicated between the wearable devices. Each of the wearable devices includes the induction circuit 34 which may be a magnetic induction circuit, a near field induction circuit, or a near field magnetic induction circuit. Use of the induction circuit 34 allows the wearable devices to communicate with one another even through the human body. Where the wearable devices are both earpieces, the induction circuit 34 allows the earpieces to communicate through the human head. A near field magnetic induction (NFMI) circuit may include a core and a plurality of coil turns wrapped around the core. The core may include ferrite or may be an open air core or other type of core.

The wearable devices 14 also include a radio transceiver 36 for wireless communications. Although it is contemplated that the radio transceiver 36 may be of any number of types and use any number of different communication protocols, one example of a radio transceiver that may be used is a Bluetooth radio transceiver. Other examples include ultra-wideband (UWB) transceivers, frequency modulation (FM) radio transceivers, or any number of other types of radio transceivers. One of the purposes of the radio transceiver 36 is for communication with other computing devices including mobile devices. FIG. 3 illustrates one example of a mobile device 60 with a machine readable storage medium upon which a software application or "app" 62 may be stored. The radio transceiver may be used to communicate information between the wearable device and the mobile device 60. The information may include one or more audio streams. For example, the mobile device 60 may communicate an incoming audio stream including a voice signal associated with a phone call or chat session or audio or video conference to the radio transceiver of the wearable device. Similarly, the radio transceiver of the wearable device may communicate an outgoing audio stream including a voice signal associated with the user of the wearable device to the mobile device. Alternatively, music may be streamed to or from the wearable device. Of course, there are many other examples of information which may be communicated between the wearable device and mobile devices or computing devices. This may include user input, sensor readings, audio information, diagnostic information, and other types of information or data. In addition, the mobile device 60 and app 62 may be operatively connected to a network 68 and may communicate user input, sensor readings, audio information, diagnostic information, and other types of information or data across the network 68.

Thus, in operation a method is provided for communication between wearable devices. The method may include communicating information between the first wearable or personal area device and the second wearable or personal area device using the induction circuit of the first wearable device and the induction circuit of the second wearable device. The information may be of any number of types including an audio stream or a stream from an input sensor signal or other type of data. Note that using an induction circuit avoids numerous issues associated with radio communications including the need for frequent recalibration, RF tuning, persistent and unacceptable drops in outputs, and other issues. Moreover, using an induction circuit avoids issues with the body absorbing the RF especially the soft tissues of the head, brain and neck. In addition, use of the induction circuit is appropriate for communications in any number of different environments including high humidity environments such as on a beach, walking through snow, on a forest floor or while submerged in water.

It is to be further understood that where the devices are ear pieces or other wearable or personal area devices, that the induction circuit is configured for high bandwidth audio suitable for music or ambient noise. Note that this is in contrast to devices such as hearing aids which have bandwidths specifically constrained to those associated with the vocal range (e.g. around 7 kHz and under). Thus, preferably the device is configured to provide a bandwidth of more than 7 kHz (with less than 3 dB loss), more than 8 kHz (with less than 3 dB loss), more than 9 kHz (with less than 3 dB loss), more than 10 kHz (with less than 3 dB loss), more than 11 kHz (with less than 3 dB loss), more than 12 kHz (with less than 3 dB loss), more than 13 kHz (with less than 3 dB loss), more than 14 kHz (with less than 3 dB loss), more than 15 kHz (with less than 3 dB loss), more than 16 kHz (with less than 3 dB loss), more than 17 kHz (with less than 3 dB loss), more than 18 kHz (with less than 3 dB loss), more than 19 kHz (with less than 3 dB loss), or more than 20 kHz (with less than 3 dB loss). Therefore, the term "high bandwidth audio" as used herein refers to a bandwidth which is greater than that associated with the vocal range and thus more than 7 kHz with less than 3 dB loss. The induction circuit is configured for high bandwidth audio by selection of the coil parameters and/or other circuitry which achieve the desired bandwidth and loss.

Therefore various examples of wearable or personal area devices and related methodologies and systems have been shown and described. It is to be understood that the present invention contemplates numerous options, variations, and alternatives. Therefore, the present invention is not to be limited to the specific disclosure set forth herein.

What is claimed is:

1. A system of wearable or personal area devices comprising:
   a first earpiece comprising (a) a first earpiece housing, (b) an induction circuit disposed within the first earpiece housing for short range communication, (c) a radio transceiver disposed within the first ear piece housing for radio communications, (d) wherein the induction circuit within the first ear piece is adapted for communication using high bandwidth audio; wherein the induction circuit is a near field magnetic induction circuit, (e) wherein the high bandwidth audio is more than 10 kHz with less than 3dB loss; and
   a second earpiece comprising a second earpiece housing and an induction circuit disposed within the second earpiece housing for short range communication with the first earpiece.

2. The system of claim 1 wherein the induction circuit is a near field magnetic induction circuit.

3. The system of claim 2 wherein the radio transceiver is a Bluetooth radio transceiver.

4. The system of claim 2 wherein the radio transceiver is a frequency modulation (FM) radio transceiver.

5. The system of claim 1 further comprising a mobile device in operative communication with the first earpiece via the radio transceiver disposed within the ear piece housing of the first earpiece.

6. The system of claim 5 wherein the mobile device is in operative communication with the second earpiece via a radio transceiver disposed within the ear piece housing of the second earpiece.

7. An earpiece comprising:
   an earpiece housing;
   an induction circuit disposed within the ear piece housing for short range communication; and
   a radio transceiver disposed within the ear piece housing for radio communications;
   wherein the induction circuit within the ear piece is adapted for communication using high bandwidth audio;
   wherein the induction circuit is a near field magnetic induction circuit;
   wherein the high bandwidth audio is more than 10 kHz with less than 3 dB loss.

8. The earpiece of claim 7 wherein the earpiece is a left earpiece.

9. The earpiece of claim 7 wherein the earpiece is a right earpiece.

10. The earpiece of claim 7 further comprising a battery disposed within the earpiece, the battery operatively connected to the induction circuit and the radio transceiver.

11. The earpiece of claim 7 further comprising an intelligent control disposed within the earpiece housing, the intelligent control operatively connected to the induction circuit and the radio transceiver.

12. The earpiece of claim 7 further comprising at least one microphone associated with the earpiece housing.

13. The earpiece of claim 7 further comprising one or more speakers associated with the earpiece housing.

14. The earpiece of claim 7 further comprising storage disposed within the earpiece for storing a plurality of audio files.

15. An earpiece comprising:
   an earpiece housing;
   an induction circuit disposed within the ear piece housing for short range communication;
   a radio transceiver disposed within the ear piece housing for radio communications;
   an intelligent control disposed within the earpiece housing;
   a microphone associated with the earpiece housing;
   a speaker associated with the earpiece housing;

a battery disposed within the earpiece housing and operatively connected to the induction circuit, the radio transceiver and the intelligent control;

a storage device disposed within the earpiece housing for storing one or more audio files, the storage device operatively connected to the intelligent control;

wherein the induction circuit is adapted for communication using high bandwidth audio of more than 10 kHz with less than a 3 dB loss.

16. The earpiece of claim 15 wherein the induction circuit is a near field magnetic induction circuit.

17. The earpiece of claim 16 wherein the radio transceiver is a Bluetooth transceiver.

18. The earpiece of claim 17 wherein the earpiece housing is water resistant to allow for use of the earpiece when submerged in water.

* * * * *